United States Patent
Agrawal et al.

(10) Patent No.: US 8,029,194 B2
(45) Date of Patent: Oct. 4, 2011

(54) RESTRAINED, REVERSE MULTI-PAD BEARING ASSEMBLY

(75) Inventors: Giridhari L. Agrawal, Simsbury, CT (US); Thomas A. Accomazzo, Wethersfield, CT (US); Michael Brophy, Smithfield, RI (US)

(73) Assignee: R&D Dynamics Corporation, Bloomfield, CT (US)

( * ) Notice: Subject to any disclaimer, the term of this patent is extended or adjusted under 35 U.S.C. 154(b) by 563 days.

(21) Appl. No.: 12/140,432

(22) Filed: Jun. 17, 2008

(65) Prior Publication Data
US 2008/0310779 A1 Dec. 18, 2008

Related U.S. Application Data

(60) Provisional application No. 60/944,582, filed on Jun. 18, 2007.

(51) Int. Cl.
*F16C 32/06* (2006.01)
(52) U.S. Cl. .......................... 384/106; 384/103; 384/104
(58) Field of Classification Search .......... 384/103–106, 384/114, 301, 305
See application file for complete search history.

(56) References Cited

U.S. PATENT DOCUMENTS

| | | | |
|---|---|---|---|
| 3,366,427 A * | 1/1968 | Silver et al. | 384/103 |
| 3,615,121 A | 10/1971 | Barnett et al. | |
| 3,809,443 A | 5/1974 | Cherubim | |
| 4,295,689 A | 10/1981 | Licht | |
| 4,348,066 A | 9/1982 | Agrawal et al. | |
| 4,415,280 A | 11/1983 | Agrawal | |
| 4,415,281 A | 11/1983 | Agrawal | |
| 4,475,824 A * | 10/1984 | Glaser et al. | 384/306 |
| 4,549,821 A | 10/1985 | Kawakami | |
| 4,552,466 A | 11/1985 | Warren | |
| 4,699,523 A * | 10/1987 | Hagemeister | 384/103 |
| 4,767,222 A | 8/1988 | Paletta et al. | |
| 4,950,089 A | 8/1990 | Jones | |
| 5,228,785 A * | 7/1993 | Saville et al. | 384/103 |
| 5,427,455 A | 6/1995 | Bosley | |
| 5,634,723 A | 6/1997 | Agrawal | |
| 5,658,079 A | 8/1997 | Struziak et al. | |
| 5,911,510 A * | 6/1999 | Saville | 384/106 |
| 5,911,511 A * | 6/1999 | Saville | 384/106 |
| 6,921,207 B2 | 7/2005 | Matsunaga | |
| 6,953,283 B2 | 10/2005 | Matsunaga | |

(Continued)

FOREIGN PATENT DOCUMENTS

JP 58160619 9/1983

(Continued)

*Primary Examiner* — Marcus Charles
(74) *Attorney, Agent, or Firm* — McCormick, Paulding & Huber LLP (57) ABSTRACT

A hydrodynamic fluid film bearing assembly has a stationary retaining member defining a central opening and having an inner surface lined by a foil assembly comprised of a plurality of foil subassemblies. Each foil subassembly comprises a first compliant foil, a second compliant foil, and a spring foil, and subtending a rotational segment, less than all, of the inner surface of the retaining member. The complaint foils and the spring foil of each foil subassembly are held within the retaining member in such a way that sliding travel of one compliant foil along the inner surface of the opening is in the opposite rotational direction of sliding travel of the other compliant foil and the spring foil. The foil subassemblies may be restrained from undesired movement during operation by a retention tab extending from the foil subassembly which engages a channel and recess feature formed in the retaining member.

27 Claims, 3 Drawing Sheets

U.S. PATENT DOCUMENTS

| | | |
|---|---|---|
| 6,964,522 B2 | 11/2005 | Kang et al. |
| 6,997,613 B2 | 2/2006 | Katou et al. |
| 7,056,025 B2 | 6/2006 | Nakata |
| RE39,190 E | 7/2006 | Weissert |
| 7,070,330 B2 | 7/2006 | Agrawal |
| 7,553,086 B2 * | 6/2009 | Kang et al. .................... 384/103 |
| 7,648,279 B2 * | 1/2010 | Struziak et al. ................ 384/103 |
| 7,832,933 B2 * | 11/2010 | Adams et al. .................. 384/103 |
| 2008/0253704 A1 | 10/2008 | Struziak et al. |

FOREIGN PATENT DOCUMENTS

| | | |
|---|---|---|
| JP | 59-93515 | 5/1984 |

* cited by examiner

RESTRAINED, REVERSE MULTI-PAD BEARING ASSEMBLY

CROSS-REFERENCE TO RELATED APPLICATION

This application claims the benefit of U.S. Provisional Application No. 60/944,582, filed Jun. 18, 2007, which is incorporated herein by reference.

FIELD OF THE INVENTION

The field of the present invention relates generally to hydrodynamic fluid film bearings and, more particularly, to bearing assemblies employing a plurality of thin foils lining the inner surface of a retaining member within which a high-speed rotating shaft is receivable, to establish and maintain a lubricating fluid film, e.g., air, between the foils and the rotating shaft.

BACKGROUND OF THE INVENTION

Recent efforts have been made to improve bearings for high-speed rotating machinery, such as gas turbines for aircraft engines, missile engines or power generation (auxiliary power units). Such efforts have led to the development of various designs for fluid film hydrodynamic bearings. Generally, fluid film hydrodynamic bearings have been successfully employed in high-speed rotating machines for about the past twenty years. For example, air cycle machines used for aircraft cabin environment control systems utilize fluid film hydrodynamic bearings. Such bearings generally operate on the principle that a high-speed rotating member, such as a shaft, journal, or thrust runner, and an adjacent element, such as a compliant foil or the like, establish and maintain a pressurized fluid film therebetween. Moreover, such bearings operate on the principle that the high-speed rotating member is at least slightly eccentric with respect to rotation about its longitudinal axis. Therefore, if the rotating member is enclosed by a close-fitting, compliant, annular element such as a thin foil, or multiple such foils, encased within a stationary retaining member (sometimes referred to as a sleeve, a cartridge, a retainer, a bushing or a base), the eccentricity of rotation within such retaining member will form and maintain the pressurized fluid film layer, sometimes referred to as a fluid film wedge, between the rotating member and the compliant foil. The fluid film layer, in turn, provides a lubricated support for the rotating member.

More specifically, the high-speed rotation of the rotating member generates a high pressure in the fluid film layer, which fluid film supports the load imposed by the rotating shaft. A resilient backing member—e.g., a spring foil—is often disposed between a smooth, compliant foil and the stationary retaining member to accommodate deflections of the compliant foil resulting from pressurization, centrifugal forces and temperature differentials caused within the retaining member in order to maintain optimum or at least adequate fluid film layer geometry. Desirable fluid film hydrodynamic bearings have high load capacity and high coulomb damping for suppression of shaft whirl and excursions of the rotating member due to bearing loading and imbalances. Providing such desired characteristics for optimal performance has typically required stringent control of manufacturing tolerances of the fluid film hydrodynamic bearing.

One type of known fluid film hydrodynamic bearing is a multi-pad type as described in U.S. Pat. No. 3,615,121 to Barnett et al. and U.S. Pat. Nos. 4,153,315, 4,178,046 and 4,195,395 to Silver et al. Such prior art multi-pad bearings commonly have an iris-type construction. Moreover, the foils are typically unidirectional and overlapping. Generally, coulomb damping, which is required to suppress whirl of the rotating member, is low for such multi-pad bearings, and the low damping levels have limited the utilization of such bearings for high-speed rotating machinery. The three aforementioned patents to Silver et al. further teach stiffener elements for the smooth foils.

U.S. Pat. No. 4,178,046 discloses a foil bearing assembly in which a plurality of smooth foils is mounted within the retaining member or bushing, each subtending a rotational segment, less than all, of the circumferential or inner surface of the retaining member. Each foil comprises two sides or wings extending in opposite directions from a midpoint. Each foil is mounted at its midpoint with one side or wing of the foil serving as an underfoil for the overfoil of an adjacent foil and the other arm or wing serving as an overfoil for the underfoil of an adjacent foil on its opposite side. The arrangement of the foils is such that the sliding travel or shifting of adjacent foils (which results from the forces imposed on the foils by the pressurized fluid film generated by the rotating shaft) is in the same direction. Consequently, the relative sliding travel between adjacent foils is the difference between the amount of sliding travel of each foil. This limited relative foil movement contributes to the low coulomb damping characteristic of these multi-pad bearings. In order to compensate for such limited coulomb damping levels, the art often provides multi-pad bearing foils having a preformed diameter—i.e., the foil diameter prior to insertion of the rotating shaft into the bearing—which is up to 50% less than the diameter of the shaft. Consequently, when the shaft is initially mounted within the bearing, the bearing foils maintain a relatively tight grip on the shaft. This results in a high preloading on the shaft and thereby requires a high starting torque for the rotating shaft. If any type of contaminant, such as water, is present in the bearing, a still higher starting torque is required. Such high starting torque is, of course, disadvantageous as it stresses the machinery being used to drive the shaft and may be severe enough to result in inability to start the engine or motor driving the shaft and/or cause wear or damage to the engine, motor or other drive components. The tight grip of the bearing foil in the shaft also makes the foil susceptible to rotational deflection and slipping during start up and operation of the rotating shaft.

Improved bearings have been provided in the form of reverse 360-degree multi-layer hydrodynamic fluid film foil bearings described in U.S. Pat. Nos. 4,415,280 and 4,415,281 issued to G. L. Agrawal, incorporated herein by reference. In these bearings, two layers of smooth compliant foils are arranged to shift in opposite rotational directions. The smooth foils are supported on a layer of corrugated foil which serves as a resilient spring foil and provides high load capacity for the bearing. Due to the fact that adjacent foils shift in opposite directions, coulomb damping is relatively high because the relative movement between adjacent foils is equal to the sum of the individual foil movements. Accordingly, adequate coulomb damping is attained without the necessity of reducing the preformed diameter of the foils to significantly less than that of the shaft. Consequently, preloading imposed on the shaft by the foils is small and the starting torque required is not significantly increased by the bearing. However, because the foils are a single-pad type, and thus are supported at only one end thereof, extending for 360-degrees around the entire circumference of the inner surface of the stationary retaining member, the foils of these otherwise successful bearings occasionally telescope during assembly and operation. If the foils should telescope during operation, the telescoped foils tighten around the shaft and bind it. Ultimately, this leads to bearing failure. Further, manufacture of such 360-degree single-pad foils is expensive as it requires extensive manual operations to position the foils so as to hold the required tolerances during operation.

Improved bearings were provided in the form of reverse multi-pad hydrodynamic fluid film foil bearings described in U.S. Pat. No. 5,634,723 issued to G. L. Agrawal, incorporated herein by reference. The key features of a reverse multi-pad bearing are as follows. A retaining member has an inner surface, which defines a shaft opening within which a rotatable shaft is receivable for rotation. A foil assembly lines the inner surface of the retaining member and comprises a plurality of foil sub-assemblies, the foil sub-assemblies each subtending a rotational segment, less than all, of the inner surface. The foil sub-assemblies comprise compliant contact foils disposed in overlying contact with spring foils which are disposed radially outwardly of their associated contact foils. The spring foils and the contact foils are affixed to the retaining member in respective opposite-facing rotational directions along the inner surface. With this arrangement, sliding travel of the spring foils is in the opposite rotational direction of sliding travel of the contact foils. This design provides the high coulomb damping similar to the reverse 360-degree multi-layer foil bearing but requires a higher preload to keep the bearing assembly together during bearing installation and operation. This preload is still less than the original multi-pad bearing designs, as described by U.S. Pat. No. 3,615,121 to Barnett et al. and U.S. Pat. Nos. 4,153,315, 4,178,046 and 4,195,395 to Silver et al. Additionally, manufacturing of reverse multi-pad hydrodynamic fluid film bearings is simpler than the previous designs of hydrodynamic fluid film bearings with challenges only coming from assembly of the components into the retaining member or bushing.

In all of the prior art bearing designs, be they multi-pad or single-pad types, same direction or reverse direction, there is susceptibility of deflection of the foils at the point where they are supposed to be held in the retaining member. Specifically, during rotation of the shaft, there is a tendency for the foils to "pop up" or radially deflect, which compromises compliancy of the bearing. Such deflection occurs despite an end of each of the foils often being mounted, in part, within the stationary retaining member. In many designs, an end of the foil is disposed within a channel or keyway formed in the inner surface of the retaining member to position the foils as well as to prevent axial slipping of the foils when the rotating member is rotating. Commonly, the foil is attached to a key, pin or other support slidably disposed within the channel as shown in U.S. Pat. No. 3,615,121 to Barnett and U.S. Pat. Nos. 4,415,280 and 4,415,281 to Agrawal. Alternatively, the end of the foils can be bent to fit into a channel. However, heretofore, the bent or shaped end of such foil has typically been designed to permit some radial movement of the foil, as, for example, exhibited in the pivotally disposed foils shown and described in U.S. Pat. No. 4,348,066 to G. L. Agrawal, incorporated herein by reference. Moreover, such "hinged" foils place a greater emphasis on the manufacturing process of the bearing—notably, if the size of the "hinge" is too small, the foil will be loose in the channel and lead to a loss of positive bearing retention.

Accordingly, there has long been a desire to design such bearings and foil assemblies to prevent radial deflection while keeping the bearing loaded to desired level so as to maintain desired compliancy of the bearing foils. At the same time, it is further desirable that such bearings and foil assemblies restrict rotational slipping and telescoping within the retaining member so as to maintain desired compliancy, load capacity and coulomb damping levels.

SUMMARY OF THE INVENTION

In one aspect of the present invention, a hydrodynamic fluid film bearing assembly comprises a retaining member having an inner surface defining a central opening within which a rotatable shaft is receivable for rotation. A plurality of longitudinally extending channels are formed into the inner surface of the retaining member. A foil assembly is disposed within and generally lines the inner surface of the retaining member and comprises a plurality of foil subassemblies. Each foil subassembly subtends a rotational segment, less than all, of the circumferential or inner surface of the retaining member, and comprises (i) a first compliant foil; (ii) a second compliant foil disposed radially outwardly of the first compliant foil; and (iii) a spring foil disposed radially outwardly of the first and second compliant foils. The first compliant foil, the second compliant foil, and the spring foil of each foil subassembly are mounted within the retaining member with the second compliant foil extending within the central opening in a first rotational direction and the spring foil and the first compliant foil extending within the central opening in a second rotational direction opposing the direction of the second compliant foil. Thus, the sliding travel of the spring foil and the first compliant foil is in the opposite rotational direction than sliding travel of the second compliant foil.

The present invention is further directed to a retention tab extending from a proximal end of at least one of the first compliant foil, the second compliant foil and the spring foil. The retention tab is adapted to fit within one of the longitudinally extending channels formed into the retaining member, wherein at least a portion of the retention tab extends in a generally non-radial direction. The channel into which the retention tab is fit further includes a recess portion that receives the non-radially extending portion of the retention tab for restraining the foil subassembly form radial deflection.

Generally, in accordance with the present invention, there is provided a hydrodynamic fluid film bearing which may be denominated a "restrained reverse multi-pad bearing" and which overcomes the above-noted disadvantages of the known multi-pad bearings, reverse multi-pad bearing and 360-degree reverse multi-layer bearings. The restrained reverse multi-pad bearing of the present invention has advantages over existing bearing designs in that it is not subject to radial deflection, rotational slipping or telescoping failure, exhibits a high coulomb damping friction, has a high load capacity, a small starting torque requirement similar to the reverse 360-degree multi-layer bearing, is resistant to the presence of contaminants in the bearing, and can be easily manufactured and assembled.

In an aspect of the present invention, each foil subassembly is preferably held in place within the retaining member by a tab or projection that engages a respective, preferably complementarily-shaped retention feature located on the retaining member to prevent at least radial deflections of the foil elements. The retention tab may be formed as an extension of either the first compliant foil or the second compliant foil, or both. Alternatively, the retention tab may be a separate element attached to the end of the first compliant foil, the second compliant foil, or both. Still alternatively, a tab or projection may be formed as an extension of or provided as a separate element to the spring foil in lieu of or in addition to a tab or projection formed in or attached to one or both of the compliant foils.

One aspect of the invention provides for the following construction. The spring foil has a terminal proximal edge mounted in the retaining member and an opposite terminal distal edge facing in a rotational direction along the inner surface of the stationary retaining member. The compliant foils are likewise mounted in the retaining member and have respective distal edges facing in opposing rotational directions, one of the compliant foils extending in the same rotational direction as the spring foil, and the other compliant foil, therefore, extending in an opposite rotational direction. In a preferred embodiment, the second, compliant foil has sliding travel in a first rotational direction, and the first, complaint foil and the spring foil have sliding travel in an opposite second rotation direction within the annular opening between the stationary retaining member and the rotating shaft.

Another aspect of the present invention positions foil subassemblies between adjacent foil subassemblies, one on each side, such that the second compliant foil of a "middle" foil subassembly overlaps the spring foil and is overlapped by the first compliant foil of the adjacent foil subassembly positioned on one side thereof. Likewise, the first compliant foil of the "middle" foil subassembly overlaps the second compliant foil of the adjacent foil subassembly positioned on the opposite side thereof, which, in turn, overlaps the spring foil of the "middle" foil subassembly. In preferred embodiments, the second compliant foil of each foil subassembly overlaps substantially the entire length of the adjacent spring foil, and the first compliant foil of each foil subassembly overlaps substantially the entire length of the adjacent second compliant foil. In still further preferred embodiments, the first compliant foil of each foil subassembly overlaps a portion of the first compliant foil of an adjacent foil subassembly.

Still another aspect of the present invention provides that the bearing further comprises a rotatable shaft received within the central opening of the retaining member to define between the shaft and the foil assembly an annular spacing dimensioned and configured so that a pressurized fluid film layer capable of supporting the shaft is maintainable therein.

Another aspect of the present invention provides that the stationary retaining member has a longitudinal axis and the spring foil of each foil subassembly is corrugated, the corrugations being disposed substantially parallel to the longitudinal axis of the retaining member.

The present invention provides greater control over the design of the foil subassemblies during manufacturing, and more particularly, during installation of each foil subassembly into respective channels, so as to reduce any inconsistencies in the foil assemblies during manufacturing, eliminate the looseness of the foil assemblies in their respective channels where desired, and prevent loss of positive bearing retention.

These and other features of the present invention are described with reference to the drawings of preferred embodiments of a restrained, reverse multi-pad bearing assembly, and its components. The illustrated embodiments of the present invention are intended to illustrate, but not limit the invention.

DETAILED DESCRIPTION OF THE INVENTION AND PREFERRED EMBODIMENTS THEREOF

A goal of the present invention is to design a foil bearing assembly that can be kept loaded at a desired level to maintain the desired compliancy of the foil elements during operation. In order to achieve this goal, the bearing assembly must avoid undesirable radial deflection, rotational slipping, and telescoping within a stationary retaining member. Radial deflection, or "pop up", of one or more foils due to, for example, whirl of the shaft or imbalanced loading of the bearing assembly, compromises compliancy of the foils and thus affects the operation and efficiency of the system. Accordingly, the present invention relates to a hydrodynamic fluid film bearing assembly of the reverse multi-pad design with features designs to prevent radial deflection, rotational slipping and telescoping within a stationary retaining member, shown generally in FIGS. 1-3. Indeed, the features of the present invention relates to a "restrained reverse multi-pad bearing" design that overcomes the disadvantages of known multi-pad bearing designs, reverse multi-pad bearing designs, and 360-degree reverse multi-layer bearing designs.

Figure 1:
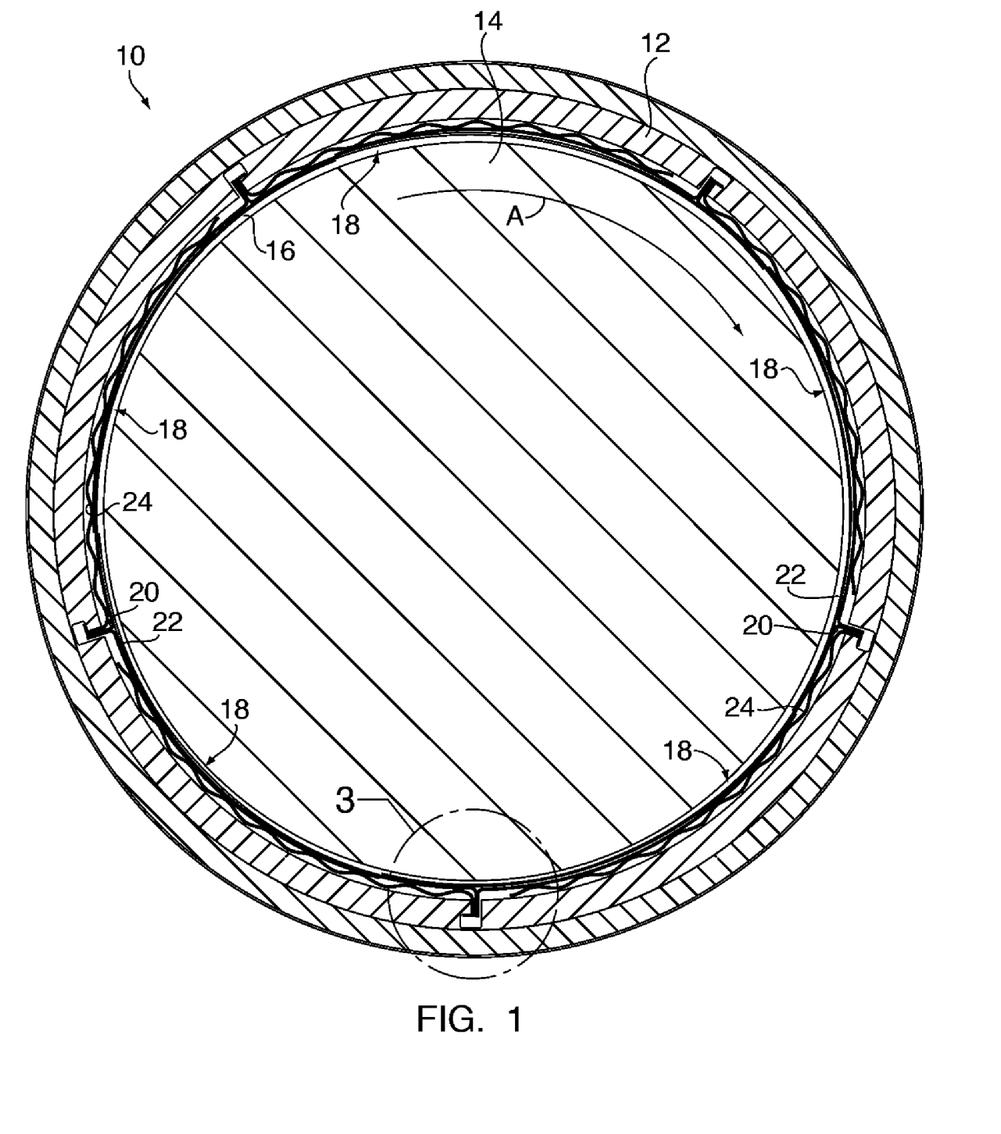
FIG. 1 is a cross-sectional view of a restrained, reverse multi-pad bearing assembly in accordance with the present invention.

FIG. 1 shows a hydrodynamic fluid film bearing assembly 10 of the restrained, reverse multi-pad design in accordance with the present invention. The bearing assembly 10 includes a stationary retaining member or bearing sleeve 12 having an inner surface defining a generally cylindrical central opening that encloses a rotating member—typically, a shaft or journal 14 mounted for rotation about a longitudinal axis. The stationary retaining member 12 generally extends along the same longitudinal axis as the shaft 14. For illustration, rotation of the shaft 14 in FIG. 1 is in the direction indicated by arrow A. An annular spacing or clearance 16 is defined between the stationary retaining member 12 and the rotating shaft 14. Preferably, the annular opening 16 is dimensioned and configured so that a pressurized fluid film layer capable of supporting the rotating shaft 14 is maintainable therein.

In a preferred embodiment, the bearing assembly 10 includes a plurality of foil subassemblies 18 arranged in a reverse multi-pad configuration, and collectively forming a foil assembly positioned within the annular spacing 16 between the stationary retaining member 12 and about the rotating shaft 14. Each foil subassembly 18 comprises a first smooth, compliant foil 20, a second smooth, compliant foil 22, and a spring foil 24. The first compliant foil 20 may be attached to or separate from the second compliant foil 22. Likewise, the spring foil 24 may be an independent component of the foil subassembly 18, or alternatively attached to one or both of the first and second compliant foils 20 and 22.

Each foil subassembly 18 is retained within the stationary retaining member 12 so that the foils line the inner surface of the retaining member 12 and lie around the outer surface of the rotating shaft 14. Preferably, each foil subassembly 18 subtends a rotational segment, less than all, of the inner surface of the retaining member 12, preferably spanning between about 30 degrees to about 120 degrees of rotation. As shown in FIG. 1, the first compliant foil 20 of each foil subassembly 18 is positioned closest amongst the three foils of the subassembly 18 to the rotating shaft 14, and as so positioned, the first compliant foil 20 may also be referred to as a "contact foil", an "inner foil" or a "top foil". The spring foil 24 is positioned closest to the inner surface of the retaining member 12, and as so position, the spring foil 24 may also be referred to as an "outer foil". The second compliant foil 22 is accordingly sandwiched between a spring foil 24 and a "contact" foil 20—though not necessarily the spring foil 24 and the first compliant foil 20 of the same foil subassembly 18 to which the second compliant foil 22 belongs. As so positioned, the second compliant foil 22 may also be referred to as an "intermediate foil".

Figure 2:
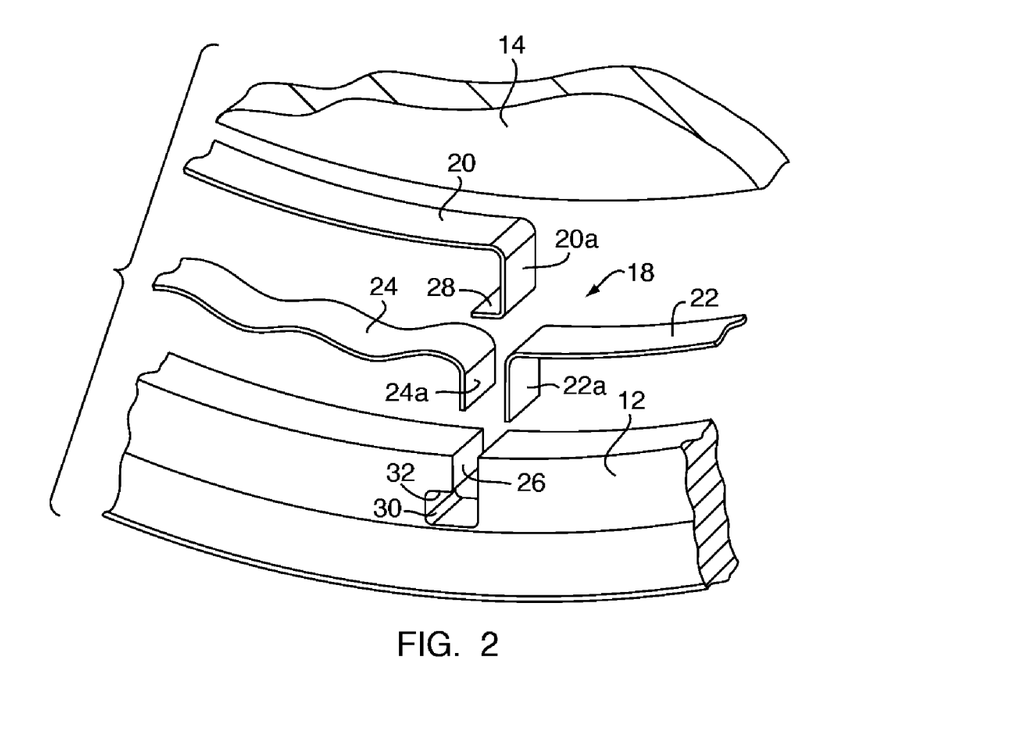
FIG. 2 is an exploded view of a foil subassembly included in the restrained, reverse multi-pad bearing assembly of FIG. 1.
Figure 3:
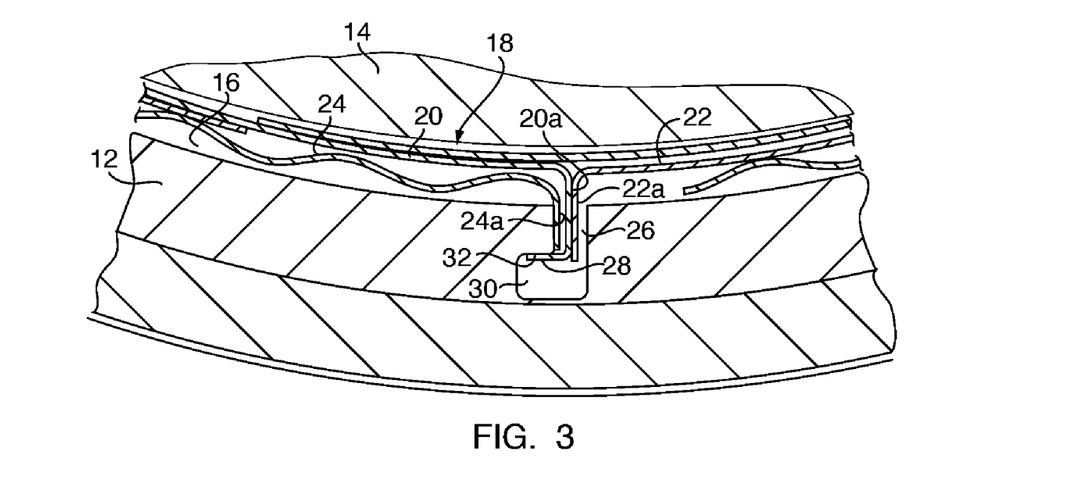
FIG. 3 is an enlarged fragmentary view of one section from the restrained, reverse multi-pad bearing of FIG. 1.

Since the bearing assembly 10 is of a reverse multi-pad design, the arrangement of the foil subassemblies 18 is such that the first compliant foil 20, the second compliant foil 22, and the spring foil 24 are mounted within the retaining member 12 so that the second compliant foil 22 is disposed within the annular opening 16 along a first rotational direction, while the first compliant foil 20 and the spring foil 24 are disposed within the annular opening 16 along a second rotational direction opposing the direction of the second compliant foil 22. The arrangement of the foils is illustrated more clearly in FIG. 2, which shows the components of a foil subassembly 18 removed from the retaining member 12. As so arranged within the retaining member 12, the sliding travel of the spring foil 24 and the first compliant foil 20 is in the opposite rotational direction of sliding travel of the second compliant foil 22. The nature of a reverse multi-pad bearing design 10 in accordance with the present invention also positions each foil sub-assembly 18 between adjacent foil assemblies such that the second compliant foil 22 of a "middle" subassembly 18 overlaps the spring foil 24 and is overlapped by the first compliant foil 20 of the adjacent foil subassembly 18 on one side (as shown in FIG. 3, on the right side). Additionally, the first compliant foil 20 of the "middle" subassembly 18 overlaps the second compliant foil 22 of the adjacent foil subassembly 18 on the opposite side (as shown in FIG. 3, on the left side). In turn, this opposite side adjacent second compliant foil 22 overlaps the spring foil 24 of the "middle" subassembly 18. Preferably, substantially the entire length of the spring foil 24 of each subassembly 18 is overlapped by the second compliant foil 22 of the adjacent subassembly 18. Likewise, substantially the entire length of the second complaint foil 22 of each subassembly 18 is overlapped by the first compliant foil 20 of the adjacent subassembly 18. Additionally, as shown in FIG. 3, each first compliant foil 20 extends along the second rotational direction so as to overlap at least a portion of the first complaint foil 20 of the adjacent subassembly 18.

In brief, the overlapping foil subassemblies 18 form a multi-layered "sandwich" of foils around the rotating shaft 14. The sandwich includes outer foils comprising resilient spring foils 24 lining the inner surface of the stationary retaining member 12 that accommodate deflections of the compliant foils resulting from pressurization, centrifugal forces and temperature differentials due to rotation of the shaft 14. In general, the spring foils 24 are corrugated, the corrugations being disposed substantially parallel to the longitudinal axis of the rotating shaft 14 and the stationary retaining member 12. The inner-most layer of the "sandwich" comprises top foils or contact foils adjacent the rotating shaft 14, made up of a plurality of first compliant foils 20, each subtending a rotational segment, less than all of the annular spacing 16—e.g., between about 30 degrees to about 120 degrees of rotation—and due to some overlapping, collectively enveloping the rotating shaft 14. Further compliancy of the bearing assembly 10 is provided by an intermediate layer of compliant foils 22.

Preferably, the first compliant foil 20, the second compliant foil 22, and the spring foil 24 each have a generally radially extending projection (generally designated with the identifier a—e.g., first compliant foil projection 20a, second compliant foil projection 22a, and spring foil projection 24a) at an end thereof, with all three projections for the subassembly 18 being positioned or sandwiched together to project into a channel or keyway 26 formed in the retaining member 12. An attached feature, such as a retention tab 28 is provided as an extension on each foil subassembly 18 to facilitate retention of the foil subassembly 18 in the retaining member 12. The tab 28 may be formed as an extension of either the first compliant foil 20 or the second compliant foil 22, or both. Alternatively, the tab 28 may be a separate element attached to the end of the first compliant foil 20, the second compliant foil 22, or both. Still alternatively, a tab or projection may be formed as an extension of or provided as a separate element to the spring foil 24 in lieu of or in addition to a tab or projection formed in or attached to one or both of the compliant foils 20 and 22. As illustrated in FIGS. 1-3, the tab 28 is an extension of the first compliant foil 20.

The retention tab feature 28, discussed above, is typically located at the end of the foil projections, and preferably extends in a different, non-radial direction than the direction of the foil projections, which is preferably in a radial direction. The foil subassembly 18 is accordingly held in place with respect to the retaining member 12, and therefore restrained from radial deflection as well as rotational slipping and telescoping by design features of the channel 26, such as recesses 30 that accommodate the retention tab 28 to hold it in place. Preferably, the channel 26, inclusive of the recess 30, has a complementary shape to the retention tab 28 so that there is a tight fit when the foil subassembly 18 is mounted in position to effectively eliminate any undesirable radial deflection of the subassembly 18. For example, if the subassembly 18 is pulled radial inwardly, the retention tab 28 will contact a surface 32 of the recess 30 which will restrict undesired radial deflection of the subassembly 18. Rotational slipping of the subassembly 18 is restricted by engagement of the foil projections 20a, 22a and 24a with the walls of the channel 26. Telescoping is also restricted by the projections 20a, 22a and 24a and the retention tab 28, as well as by end caps (not shown) placed on the end of the retaining member 12. Further protections against rotational slipping and telescoping can be provided by the design of the retention tab 28, which can be bent, angled or hooked to limit movement of the foil subassembly 18 by engaging a corresponding complementary-shaped surface of the recess 30. Examples of various designs of the retention tab 28 and corresponding channel 26 and/or recess 30 designs are illustrated in FIG. 4 and discussed in more detail below.

FIG. 3 provides a close up view of a preferred design for a restrained reverse multi-pad hydrodynamic fluid film bearing assembly 10 in accordance with the present invention. More particularly, FIG. 3 includes a closer view of the retention features of the foil subassembly 18 and the stationary retaining member 12. As illustrated, the channel 26 in the retaining member 12, inclusive of the recess 30, is generally L-shaped, and is designed to receive a corresponding L-shaped retention tab 28 of the foil subassembly 18 extending from the end projection 20a of the first compliant foil 20. The projection 20a extends radially into the channel 26 and generally restrains the foil subassembly 18 from rotational slipping. The retention tab 28 extends in a generally non-radial direction into the recess 30 and generally restrains the foil subassembly 18 from radial deflection. The second compliant foil 22 and the spring foil 24 also have end projections 22a and 24a, respectively, to assist in restraining the foil subassembly 18 from rotational slipping and telescoping. As noted above, retention tabs may also be provided on the second compliant foil 22 and/or the spring foil 24 with out detracting from the objectives of the present invention.

The retention tab 28 is preferably provided on at least the first compliant foil 20 because that foil is closest to the rotating shaft 14 in operation and thus highly susceptible to radial deflection as a result of and due to the influence of the rotation of the shaft 14. The retention tab 28 provides an anchor for the first compliant foil 20, which tends to hold the other foils in place and restrict radial deflection. As shown in FIG. 3, the retention tab 28 extends in the same general rotational direction as the first compliant foil 20, essentially forming a C-shape. The fit between the retention tab 28 and the recess 30 is improved by taking advantage of the sliding travel of the first compliant foil 20 during operation to ensure that the retention tab 28 is contacting the walls of the recess 30 (e.g., anchoring surface 32) to hold the foil subassembly 18 in a predetermined position.

FIGS. 4A-4F illustrate alternate exemplary shapes that may be used to restrain the foil subassemblies 18 from undesired radial, rotational and telescoping deflection. For simplification, only a foil with a retention tab 28 is shown to illustrate the preferred complementary nature of the recess/tab design of the present invention. Specifically, the figures illustrate a set of angular recesses and a set of curved recesses. In describing FIGS. 4A-4F, the general term "recess" is used to represent the space formed in a stationary retaining member in which the end of a foil subassembly may be mounted to restrain movement thereof, and accordingly, this term encompasses a channel 26 as described above. Likewise, the designation of a "retention tab" in describing FIGS. 4A-4F is intended to encompass any foil projection from which the tab extends.

Figure 4A:
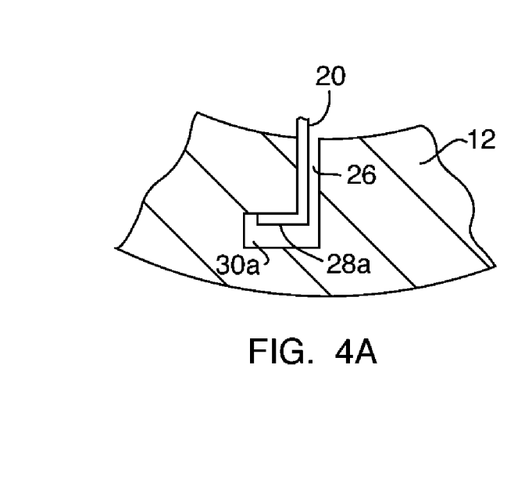
FIGS. 4A-4F illustrate fragmentary cross-sectional views of alternate designs of retention features that may be used in the restrained, reverse multi-pad bearing assembly of the present invention to restrain foil subassemblies from undesired radial, rotational and telescoping deflection.

More particularly, FIG. 4A illustrates a reverse L-shaped recess 30a formed in the retaining member 12 comprising a radial channel and a non-radial leg, with the non-radial leg of the recess preferably extending in the direction of the first compliant foil 20. As noted above, this is the design of the recess shown in FIG. 3, and preferably receives a complementary, generally L-shaped retention tab 28a.

Figure 4B:
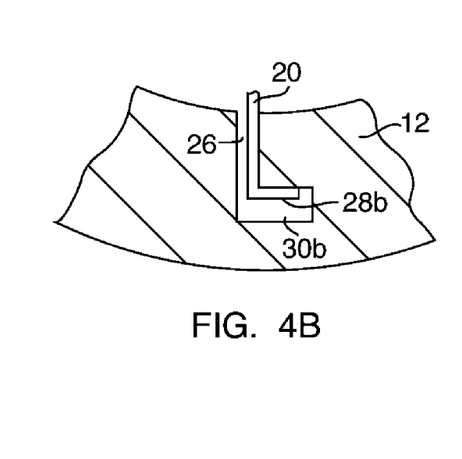

FIG. 4B illustrates an L-shaped recess 30b formed in the retaining member 12, and adapted to receive a generally L-shaped retention tab 28b. The L-shaped recess 30b is essentially a mirror of the reverse L-shaped recess 30a shown in FIG. 4A. Unlike the design of FIG. 4A, the non-radial leg of the recess 30b extends in an opposite direction from the first compliant foil 20.

Figure 4C:
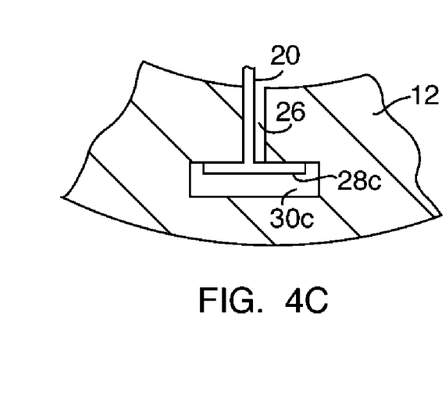

FIG. 4C illustrates an inverted T-shaped recess 30c formed in the retaining member 12. This recess 30c may receive a generally T-shaped retention tab 28c (as shown). Alternatively, the foil subassembly 18 may have multiple retention tabs (not shown)—for example, one tab formed as an extension of the first compliant foil 20 and a separate tab formed as an extension of the second compliant foil 22.

Figure 4D:
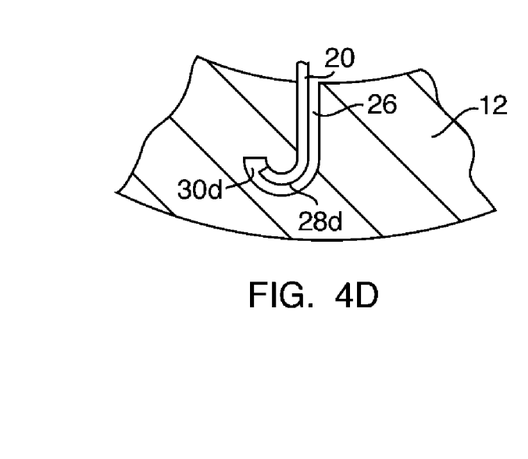
Figure 4E:
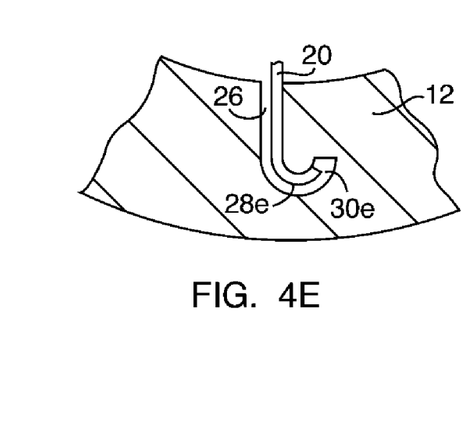

FIG. 4D illustrates a curved, J-shaped recess 30d formed in the retaining member 12, and adapted to receive a curved, generally J-shaped retention tab 28d. Similarly, FIG. 4E illustrates a curved, reverse J-shaped recess 30e formed in the retaining member 12 with corresponding curved, J-shaped retention tab 28e.

Figure 4F:
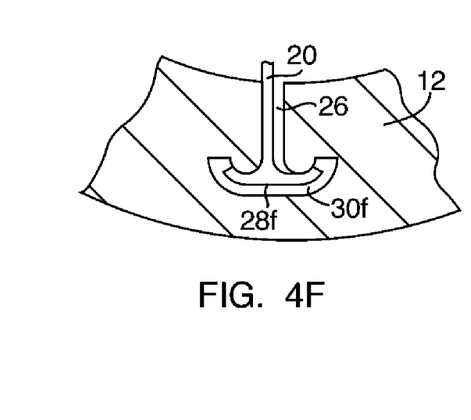

FIG. 4F illustrates a curved, inverted T-shaped recess 30f formed in the retaining member 12. As with the design of FIG. 4C, the recess 30f may receive a curved, generally T-shaped tab 28f (as shown), or alternatively, multiple curved, J-shaped retention tabs (not shown).

As noted, the recess 30 in the retaining member 12 preferably has a complementary shape to the shape of the end projections and tabs 28 of the foil subassembly 18. Though the examples illustrated in FIGS. 4A-4F provide space within the recess 30—i.e., the tab 28 doesn't fill the entire space of the recess 30—the present invention encompasses a design where the tab 28 snugly fits within the entire space of the recess 30 to restrict any movement or shifting of the tab 28, and consequently the foil subassembly 18. The present invention also contemplates recess shapes with complementary tab shapes that have different shapes, angles, curves and designs from those shown or discussed herein, so long as the shapes and designs work to retain the foil subassembly with respect to the stationary retaining member and sufficiently restrain the foil subassembly from undesirable radial deflection, rotational slipping and telescoping within the retaining member.

The foregoing description of embodiments of the invention has been presented for the purpose of illustration and description, it is not intended to be exhaustive or to limit the invention to the form disclosed. Obvious modifications and variations are possible in light of the above disclosure. The embodiments described were chosen to best illustrate the principles of the invention and practical applications thereof to enable one of ordinary skill in the art to utilize the invention in various embodiments and with various modifications as suited to the particular use contemplated. It is intended that the scope of the invention be defined by the claims appended hereto.

The invention claimed is:

1. A hydrodynamic fluid film bearing assembly comprising:
   a retaining member having an inner surface defining a central opening within which a rotatable shaft is receivable for rotation and a plurality of longitudinally extending channels formed into the inner surface; and
   a foil assembly disposed within and generally lining the inner surface of the retaining member, said foil assembly comprising a plurality of foil sub-assemblies, each foil sub-assembly subtending a rotational segment, less than all, of the inner surface and comprising:
      (i) a first compliant foil;
      (ii) a second compliant foil disposed radially outwardly of the first compliant foil; and
      (iii) a spring foil disposed radially outwardly of the first and second compliant foils;
   a projection extending in a generally radial direction at a proximal end of at least one of the first compliant foil, the second compliant foil and the spring foil and adapted to fit within one of the longitudinally extending channels formed into the retaining member, and a retention tab extending from the projection in a generally non-radial direction;
   wherein the corresponding channel into which the projection and the retention tab are fit includes a first portion extending from the inner surface of the retaining member in a generally radial direction for restricting rotational slipping of the foil subassembly and a second portion extending in a non-radial direction that receives the retention tab for restraining the foil subassembly from radial deflection; and
   wherein the first compliant foil, the second compliant foil, and the spring foil of each foil subassembly are mounted within the retaining member with the second compliant foil extending within the central opening in a first rotational direction and the spring foil and the first compliant foil extending within the central opening in a second rotational direction opposing the direction of the second compliant foil, such that sliding travel of the spring foil and the first compliant foil is in the opposite rotational direction of sliding travel of the second compliant foil.

2. The bearing assembly of claim 1 wherein the first compliant foil, the second compliant foil and the spring foil of each foil subassembly have respective proximal ends and distal ends, the proximal ends for all the foils in each foil subassembly being mounted in a corresponding channel formed in the retaining member, the distal end of the second compliant foil extending in the first rotational direction, and the distal ends of the first compliant foil and the spring foil extending in the second rotational direction.

3. The bearing assembly of claim 1, wherein each foil subassembly is mounted in the retaining member between adjacent foil subassemblies, one on each side, such that the second compliant foil of a middle foil subassembly overlaps the spring foil and is overlapped by the first compliant foil of the adjacent foil subassembly positioned on one side, and the first compliant foil of the middle foil subassembly overlaps the second compliant foil of the adjacent foil subassembly positioned on the opposite side, which, in turn, overlaps the spring foil of the middle foil subassembly.

4. The bearing assembly of claim 3 wherein the second compliant foil of the middle foil subassembly overlaps substantially the entire length of the spring foil of the adjacent foil subassembly positioned on the one side.

5. The bearing assembly of claim 3 wherein the first compliant foil of the middle foil subassembly overlaps substantially the entire length of the second compliant foil of the adjacent subassembly positioned on the opposite side.

6. The bearing assembly of claim 3 wherein the first compliant foil of the middle foil subassembly overlaps part of the first compliant foil of the adjacent foil subassembly.

7. The bearing assembly of claim 1, wherein the retention tab extends from the projection at the proximal end of the first compliant foil.

8. The bearing assembly of claim 1, wherein the retention tab extends from the projection at the proximal end of the second compliant foil.

9. The bearing assembly of claim 1, wherein the retention tab extends from the projection at the proximal end of the spring foil.

10. The bearing assembly of claim 1, wherein the collective shape of the projection and the retention tab complements the shape of the corresponding channel formed into the retaining member.

11. The bearing assembly of claim 10, wherein the projection and the retention tab collectively form a generally L-shaped member, and wherein further the channel is generally L-shaped.

12. The bearing assembly of claim 10, wherein the projection and the retention tab collectively form a generally T-shaped member, and wherein further the channel is generally T-shaped.

13. The bearing assembly of claim 10, wherein the retention tab and the channel are curved, and the projection and the retention tab collectively form a generally J-shaped member, and wherein further the channel is generally J-shaped.

14. The bearing assembly of claim 1, wherein while the foil subassembly is restrained from radial deflection by interaction between the retention tab and the second portion of the channel, the retention tab is permitted to move in the radial direction within the channel.

15. A hydrodynamic fluid film bearing assembly comprising:
a retaining member having an inner surface defining a central opening within which a rotatable shaft is receivable for rotation and a plurality of longitudinally extending channels formed into the inner surface;
a foil assembly disposed within and generally lining the inner surface of the retaining member, said foil assembly comprising a plurality of foil sub-assemblies, each foil sub-assembly subtending a rotational segment, less than all, of the inner surface and comprising:
(i) a first compliant foil;
(ii) a second compliant foil disposed radially outwardly of the first compliant foil; and
(iii) a spring foil disposed radially outwardly of the first and second compliant foils;
a retention tab extending from a proximal end of at least one of the first compliant foil, the second compliant foil and the spring foil and adapted to fit within one of the longitudinally extending channels formed into the retaining member, wherein at least a portion of the retention tab extends in a generally non-radial direction and wherein further the corresponding channel into which the retention tab is fit includes a recess portion that receives the non-radially extending portion of the retention tab for restraining the foil subassembly from radial deflection;
wherein each foil subassembly is mounted in the retaining member between adjacent foil subassemblies, one on each side, such that the second compliant foil of a middle foil subassembly overlaps the spring foil and is overlapped by the first compliant foil of the adjacent foil subassembly positioned on one side, and the first compliant foil of the middle foil subassembly overlaps the second compliant foil of the adjacent foil subassembly positioned on the opposite side, which, in turn, overlaps the spring foil of the middle foil subassembly.

16. The bearing assembly of claim 15, wherein the first compliant foil, the second compliant foil, and the spring foil of each foil subassembly are mounted within the retaining member with the second compliant foil extending within the central opening in a first rotational direction and the spring foil and the first compliant foil extending within the central opening in a second rotational direction opposing the direction of the second compliant foil, such that sliding travel of the spring foil and the first compliant foil is in the opposite rotational direction of sliding travel of the second compliant foil.

17. A hydrodynamic fluid film bearing comprising:
a retaining member having an inner surface defining a central opening within which a rotatable shaft is receivable for rotation and at least one longitudinally extending channel formed into the inner surface; and
at least one foil assembly disposed within and generally lining the inner surface of the retaining member and comprising:
(i) a first compliant foil;
(ii) a second compliant foil disposed radially outwardly of the first compliant foil; and
(iii) a spring foil disposed radially outwardly of the first and second compliant foils; and
a projection extending in a generally radial direction at a proximal end of at least one of the first compliant foil, the second proximal end of at least one of the first compliant foil, the second compliant foil and the spring foil and adapted to fit within the longitudinally extending channel formed into the retaining member, and a retention tab extending from the projection in a generally non-radial direction;
and wherein the channel includes a first portion extending from the inner surface of the retaining member in a generally radial direction for restricting rotational slipping of the foil subassembly and a second portion extending in a non-radial direction that receives the retention tab for restraining the foil assembly from radial deflection.

18. The bearing assembly of claim 17, wherein the projection and the retention tab collectively form a generally L-shaped member.

19. The bearing assembly of claim 17, wherein the projection and the retention tab collectively form a is generally T-shaped member.

20. The bearing assembly of claim 17, wherein the retention tab is curved, and the projection and the retention tab collectively form a generally J-shaped member.

21. The bearing assembly of claim 17, wherein the collective shape of the projection and the retention tab complements the shape of the corresponding channel formed into the retaining member.

22. The bearing assembly of claim 17, wherein while the foil subassembly is restrained from radial deflection by interaction between the retention tab and the second portion of the channel, the retention tab is permitted to move in the radial direction within the channel.

23. A hydrodynamic fluid film bearing assembly comprising:
   a retaining member having an inner surface defining a central opening within which a rotatable shaft is receivable for rotation and a plurality of longitudinally extending channels formed into the inner surface; and
   a foil assembly disposed within and generally lining the inner surface of the retaining member, said foil assembly comprising a plurality of foil sub-assemblies, each foil sub-assembly subtending a rotational segment, less than all, of the inner surface and comprising:
      (i) a first compliant foil;
      (ii) a second compliant foil disposed radially outwardly of the first compliant foil; and
      (iii) a spring foil disposed radially outwardly of the first and second compliant foils;
   a retention tab extending from a proximal end of at least one of the first compliant foil, the second compliant foil and the spring foil and adapted to fit within one of the longitudinally extending channels formed into the retaining member, wherein at least a portion of the retention tab extends in a generally non-radial direction;
   wherein the corresponding channel into which the retention tab is fit includes a recess portion that receives the non-radially extending portion of the retention tab for restraining the foil subassembly from radial deflection;
   wherein the first compliant foil, the second compliant foil, and the spring foil of each foil subassembly are mounted within the retaining member with the second compliant foil extending within the central opening in a first rotational direction and the spring foil and the first compliant foil extending within the central opening in a second rotational direction opposing the direction of the second compliant foil, such that sliding travel of the spring foil and the first compliant foil is in the opposite rotational direction of sliding travel of the second compliant foil; and
   wherein each foil subassembly is mounted in the retaining member between adjacent foil subassemblies, one on each side, such that the second compliant foil of a middle foil subassembly overlaps the spring foil and is overlapped by the first compliant foil of the adjacent foil subassembly positioned on one side, and the first compliant foil of the middle foil subassembly overlaps the second compliant foil of the adjacent foil subassembly positioned on the opposite side, which, in turn, overlaps the spring foil of the middle foil subassembly.

24. The bearing assembly of claim 23, wherein the second compliant foil of the middle foil subassembly overlaps substantially the entire length of the spring foil of the adjacent foil subassembly positioned on the one side.

25. The bearing assembly of claim 23, wherein the first compliant foil of the middle foil subassembly overlaps substantially the entire length of the second compliant foil of the adjacent subassembly positioned on the opposite side.

26. The bearing assembly of claim 23, wherein the first compliant foil of the middle foil subassembly overlaps part of the first compliant foil of the adjacent foil subassembly.

27. A hydrodynamic fluid film bearing assembly comprising:
   a retaining member having an inner surface defining a central opening within which a rotatable shaft is receivable for rotation and a plurality of longitudinally extending channels formed into the inner surface; and
   a foil assembly disposed within and generally lining the inner surface of the retaining member, said foil assembly comprising a plurality of foil sub-assemblies, each foil sub-assembly subtending a rotational segment, less than all, of the inner surface and comprising:
      (i) a first compliant foil;
      (ii) a second compliant foil disposed radially outwardly of the first compliant foil; and
      (iii) a spring foil disposed radially outwardly of the first and second compliant foils;
   a retention tab extending from a proximal end of at least one of the first compliant foil, the second compliant foil and the spring foil and adapted to fit within one of the longitudinally extending channels formed into the retaining member, wherein at least a portion of the retention tab extends in a generally non-radial direction;
   wherein the corresponding channel into which the retention tab is fit includes a recess portion that receives the non-radially extending portion of the retention tab for restraining the foil subassembly from radial deflection;
   wherein the first compliant foil, the second compliant foil, and the spring foil of each foil subassembly are mounted within the retaining member with the second compliant foil extending within the central opening in a first rotational direction and the spring foil and the first compliant foil extending within the central opening in a second rotational direction opposing the direction of the second compliant foil, such that sliding travel of the spring foil and the first compliant foil is in the opposite rotational direction of sliding travel of the second compliant foil; and
   wherein the retention tab extends from the proximal end of the first compliant foil.

* * * * *